(12) United States Patent
Li

(10) Patent No.: US 12,211,022 B2
(45) Date of Patent: Jan. 28, 2025

(54) GRAVITY-BOX-BASED SNACK VENDING APPARATUS AND NETWORK VENDING SYSTEM USING THE APPARATUS

(71) Applicant: Jiangxi Enco Intelligence Technology CO., ltd., Nanchang (CN)

(72) Inventor: Guoping Li, Nanchang (CN)

(73) Assignee: Jiangxi Enco Intelligence Technology CO., ltd., Nanchang (CN)

( * ) Notice: Subject to any disclaimer, the term of this patent is extended or adjusted under 35 U.S.C. 154(b) by 955 days.

(21) Appl. No.: 17/233,585

(22) Filed: Apr. 19, 2021

(65) Prior Publication Data
US 2021/0241247 A1 Aug. 5, 2021

Related U.S. Application Data

(63) Continuation-in-part of application No. PCT/CN2018/122586, filed on Dec. 21, 2018.

(51) Int. Cl.
| | |
|---|---|
| *G06Q 20/18* | (2012.01) |
| *B65G 29/02* | (2006.01) |
| *G01G 19/414* | (2006.01) |
| *G07F 9/00* | (2006.01) |

(52) U.S. Cl.
CPC ............ *G06Q 20/18* (2013.01); *B65G 29/02* (2013.01); *G01G 19/4144* (2013.01); *G07F 9/002* (2020.05)

(58) Field of Classification Search
CPC ..................................................... G06Q 20/18

USPC ........................................................... 700/241
See application file for complete search history.

(56) References Cited

U.S. PATENT DOCUMENTS

| | | | | |
|---|---|---|---|---|
| 4,630,042 A | * | 12/1986 | Kawasaki | ............... G07F 9/002 |
| | | | | 340/10.41 |
| 7,111,754 B1 | * | 9/2006 | Siemens | ................. G07F 11/24 |
| | | | | 221/202 |

FOREIGN PATENT DOCUMENTS

| | | |
|---|---|---|
| CN | 202358501 U | 8/2012 |
| CN | 206875901 U | 1/2018 |

* cited by examiner

*Primary Examiner* — Gene O Crawford
*Assistant Examiner* — Ayodeji T Ojofeitimi

(57) ABSTRACT

The present invention relates to a gravity-box-based snack vending apparatus including a storage container for storing snacks and a delivery module. A bottom of the storage container is in communication with a material outlet of the delivery module. The delivery module includes a discharging apparatus housing and a transmission apparatus. The transmission apparatus includes a driving gear driven by an external force, a driven gear engaged with the driving gear, and a rotating wheel structure coaxially rotating with the driven gear. The rotating wheel structure includes a rotating shaft and blades mounted on the rotating shaft. The rotating shaft and the blades are provided across a material outlet. Granular materials fall on the blades, and two front and rear blades in a static state just block the material outlet.

17 Claims, 12 Drawing Sheets

GRAVITY-BOX-BASED SNACK VENDING APPARATUS AND NETWORK VENDING SYSTEM USING THE APPARATUS

TECHNICAL FIELD

The present invention relates to technical fields of bulk food display and vending container structure design, and in particular, to a gravity-box-based snack vending apparatus, and discloses a network vending system using the apparatus simultaneously.

BACKGROUND

Soybeans, rice, melon seeds, pistachios, and other small-particle dried fruit food are food and snack foods that the people can't live without in their daily life. Because such goods are generally in bulk and people buy such goods in different, quantities, they are generally sold in special places such as supermarkets and vegetable markets. During purchase, people go through multiple steps such as taking, weighing, pricing, and payment. In this process, there are often problems such as location change, error making due to manual participation, and inaccurate weighing/pricing. In case of increasingly higher labor costs and increasingly pursuing of precision and efficiency in the modern society, it is increasingly difficult for such vending method to adapt to the development of the times. Especially for snack foods such as the melon seeds and the pistachios, because of cumbersome steps, low efficiency, and inaccurate weighing/pricing problems caused by such centralized vending method in special places, it is even more difficult to meet the needs of modern society. Meanwhile, in shopping malls, communities, and many other crowded areas, there is an increasing number of vending machines, which also reflects people's demand for such vending type.

SUMMARY

The present invention provides a gravity-box-based snack vending apparatus, and discloses a network vending system using the apparatus simultaneously in order to overcome defects in the prior art.

The present invention is implemented through the following solutions:

A gravity-box-based snack vending apparatus includes a storage container for storing snacks and a delivery module, a bottom of the storage container being in communication with a material outlet of the delivery module. The delivery module includes a discharging apparatus housing and a transmission apparatus. The transmission apparatus includes a driving gear driven by an external force, a driven gear engaged with the driving gear, and a rotating wheel structure coaxially rotating with the driven gear. The rotating wheel structure includes a rotating shaft and blades mounted on the rotating shaft. The rotating shaft and the blades are provided across a material outlet. When granular materials fall on the blades, two front and rear blades in a static state just block the material outlet. During discharging, the driving gear is driven by the external force to drive the driven gear, the rotating wheel structure, and the blades to rotate, so as to pull out the granular materials falling on the blades from below the material outlet.

The blades include two sets of coaxially provided blades, which are crossed and staggered in a transverse direction, and the two sets of blades are driven by the rotating shaft of the rotating wheel structure to rotate simultaneously.

The rotating wheel structure includes a shaft sleeve, and a first wheel hub and a second wheel hub that are coaxially provided. The first wheel hub and the second wheel hub are connected by the rotating shaft. Sinking grooves are formed in surfaces of the first wheel hub and the second wheel hub. The grooves traverse the surfaces of the two wheel hubs and are big-end-up, and are distributed in the surfaces of the two wheel hubs around the rotating shaft. Insertion parts adapted to the grooves are provided at the bottoms of the blades and inserted from the outside of the grooves, and the two wheel hubs are arranged at a certain angle, so that the two sets of blades inserted are distributed in a staggered manner at a certain angle.

A power source of the transmission apparatus is a motor, where the motor is fixed on the discharging apparatus housing, a center of a circle of the driving gear has a first hole, and the driving, gear is sleeved with a motor output shaft sleeve through the first hole and connected to the motor.

A stirring apparatus for preventing accumulation of granular materials is further included. The stirring apparatus includes, a connecting rod, a rocker, and a stirring rod. The driven gear is provided with a driven gear limiting boss on the inside and an eccentric boss on the outside. A second hole is formed in the eccentric boss. One end of the connecting rod is hinged with the second hole in the eccentric boss of the driven gear, and the other end of the connecting rod extends diagonally upward and its inner side is hinged with an upper end of the rocker. The stirring rod is hinged to an upper end of the rocker. The stirring rod is located inside the discharging apparatus housing, and is provided with a limiting boss. A rotating pin is provided at the center of the limiting boss, and a pin hole through which the rotating pin passes is formed in the discharging apparatus, housing. The rotating pin is in clearance fit with the pin hole and is hinged with the rocker through the pin hole. The connecting rod and the rocker are located outside the discharging apparatus housing. The eccentric boss drives the connecting rod, the rocker, and the stirring rod to form a crank rocker structure, so as to drive the stirring rod to perform circular arc movement at a certain angle to stir materials accumulated in the discharging apparatus housing.

The other end of the rocker is provided with a limiting boss. The limiting boss, the limiting boss on the stirring rod, a first limiting boss on the discharging apparatus housing, and an inner wall of a diversion structure together play a limiting role to prevent the stirring rod from moving axially.

An inner cavity of the storage container is provided with a material falling inclined surface being at a certain angle with a horizontal plane, and a lower end of the material falling inclined surface is layered in a stepped manner and a discharging port is formed in the lower end of the material falling inclined surface. A delivery module limiting groove is formed in the discharging port. A delivery module is mounted on the discharging port.

The discharging apparatus housing is provided with a horn-shaped diversion structure. The diversion structure is attached to the inner wall of the storage container and the material falling inclined surface through a delivery module mounting position and the limiting groove to prevent material leakage. A material inlet of the discharging apparatus housing is provided with an arc-shaped plate like rotating wheel protection structure which partially covers an upper part of the rotating wheel structure.

An anti-clamping apparatus is further included. The anti-clamping apparatus includes an elastic piece and a torsion spring. A front half of the elastic piece is a straight plate, and a rear half of the elastic piece is an arc surface. A rotating shaft is provided at a head end of the elastic piece, and limiting grooves of the torsion spring are formed near the rotating shaft to prevent the elastic piece from moving axially. One end of a short arm of the torsion spring contacts an outer wall of the diversion structure, and one end of a long arm of the torsion spring contacts the elastic piece. Winding parts of the torsion spring sleeve the limiting grooves of the torsion spring of the elastic piece. The elastic piece is mounted to the discharging apparatus housing through an elastic piece mounting hole in the discharging apparatus housing. When excessive materials enter, the elastic piece is pushed away from the rotating wheel to prevent clamping. When less material enters, the elastic piece is close to the blades of the rotating wheel under the action of the torsion spring.

The storage container includes an upper cover and a lower housing. The lower housing includes a left container housing and a right container housing. The left container housing and the right container housing are buckled as a whole through a buckle, and a sealing gasket is provided between the upper cover and the lower housing.

The storage container further includes a display cabin. The display cabin has an arc-shaped plate structure protruding forward and a display gap is formed between the display cabin and a front outer wall of the lower housing of the storage container, and a discharging nozzle is provided under the display cabin.

A bulge protruding forward is provided at a front outer wall of the storage container. A baffle is provided at a lower end of the bulge. Rotating shafts are provided at both ends of the baffle A lower end of the baffle is matched with the bottom of the display cabin.

A metering module and a control module are further included. The metering module is located below the storage container and is composed of a base, a spacer, a weighing sensor, and a mounting base plate. The storage container is arranged on the base, a weight change of the storage container is measured by the weighing sensor for price calculation. The control module includes a central controller, a wireless communication module, and a payment module. After the metering module generates and displays a price, a payment interface appears, and after a user pays, an instruction is sent, by the control module, to the motor to drive the motor to start the delivery module for delivering goods.

A contact surface between the base of the metering module and the storage container is an arc surface. An elongated groove of a certain width is formed in a middle of the arc surface. A bolt mounting hole is formed at an end of the groove. An end of the arc surface is stepped in a descending manner and in a U shape. A square hole is formed in a side of "a U-shaped portion" for wiring. A square groove is formed in a bottom of a back of the base of the metering module for arrangement of a power line and a data line. A fixing hole is further formed in the arc surface of the base for clamping and fixing with the base. The fixing hole is located at a position, close to the elongated groove, of the arc surface of the base of the metering module. A narrow and square end of the fixing hole is a limiting end. A wider and square head end of the fixing, hole is a mounting buckle insertion end of the storage container. A matching mounting buckle is provided at the bottom of the storage container to fix the storage container. A boss parallel to the horizontal plane is provided at a back of the fixing hole. The boss cooperates with the mounting buckle of the storage container to limit the storage container.

A network vending system using the vending apparatus according to the present invention is provided. The network vending system includes a master station layer, a communication channel layer, and a terminal device layer composed of vending apparatuses. The master station layer is divided into a service application module, a data acquisition module, a pre communication scheduling module, and a database management module. The communication channel layer provides a communication link for information interaction between a master station and a terminal. The terminal device layer is responsible for collecting and providing original goods information and goods vending control for the entire system.

The terminal device layer is divided into a data acquisition sublayer and a vending device sublayer, and includes a vending apparatus body and a data acquisition concentrator mounted in the vending apparatus. The data acquisition concentrator is configured to connect a vending apparatus terminal with the master station layer, and performs conversion of data communication channels and a communication protocols in communication. The data acquisition sublayer collects information about the vending device, processes and freezes related data, and implements interaction with an upper-level master station. The vending device sublayer implements goods metering and sales.

The vending apparatus terminal system is composed of a microcontroller, a motor, a motor drive circuit, a LoRa communication module, a touch screen, and a weighing module. The LoRa module implements communication with the data acquisition concentrator. Data acquired by the weighing sensor of the metering module is converted by its built-in algorithm and then transmitted to a payment module. The payment module includes a user-oriented APP, and after payment by the payment module, an upper computer sends a delivery instruction to start the motor drive circuit to drive the motor for delivery.

The network vending system uses an ASA architecture and includes a cloud platform service system, a franchisee subsystem, and a distributor subsystem. Device operation data, product inventory data, product sales data, and user behavior data of the main control platform, the franchisee subsystem, the distributor subsystem, and the sales terminal are transmitted to the cloud through terminals for storage, and each role acquires different data, and processes different operations according to the division of labor. Each subsystem uses a distributed database to unify a database platform.

Beneficial effects of the present invention are shown as follows:
1. a sealed structure is used to prevent moisture of stored goods;
2. an auto-operation and auto-delivery structure is increased, a 6-inch high-definition LCD touch color screen is used, and a humanized operation interface is designed, through the operation interface, people can know information about goods (nutrient composition, best combination, and efficacy, etc.), and the gravity box is operated through the operation interface for goods purchase;
3. goods is delivered fast and delivery error control is accurate, so that an error between a delivery amount and an input target amount is ±10 g, and measurement accuracy of the gravity box may reach ±1 g;
4. online payment;
5. upper computer software;
6. the present invention has a compact layout and simple technologies of main components, and most of the accessories are standard parts that are easy to purchase, so the costs are low, and a variety of bulk foods may be conveniently stored, displayed, and flexibly taken;

and the present has an innovative detachable assembly innovative structure to be very convenient for production, transfer, and assembly, which is suitable for promotion.

In the figures, 1—Storage container, 11—Cover, 12—Sealing gasket, 13—Left container housing, 14—Buckle, 15—Right container housing, 16—Baffle, 17—Display cabin, 18—Discharging nozzle, 19—Screen mounting plate, 151—Mounting position of a delivery module, 152—Mounting buckle of a storage container, 153—Limiting groove, 154—Material falling inclined surface, 155—Delivery module limiting groove, 156—Wiring hole of a container wall;

2—Delivery module, 21—Discharging, apparatus housing, 211—Diversion structure, 212—Gear protective cover, 213—Motor mounting hole. 214—Gear limiting boss, 215—First limiting boss, 216—Rotating wheel protection structure, 217—Wiring hole, 218—Elastic piece mounting hole, 219—Rotating shaft limiting boss, 22—Transmission apparatus, 221—Motor, 222—Driving gear, 223—Driven gear, 224—Rotating wheel structure, 23—Anti-clamping apparatus, 24—Stirring apparatus, 231—Elastic piece. 232—Torsion spring, 241—Connecting rod, 242—Rocker, 243—Stirring rod, 2241—Shaft, sleeve, 2242—First wheel hub, 2243—Second wheel hub, 2244—Blades, 2245—Rotating shaft;

3—Metering module, 31—Base, 311—Fixing hole, 312—Square groove, 313—Boss, 314—Wiring hole, 341—Groove, 342—Fixed mounting hole. 32—spacer, 33—Weighing sensor. 34—Mounting base plate.

DETAILED DESCRIPTION

Figure 1:
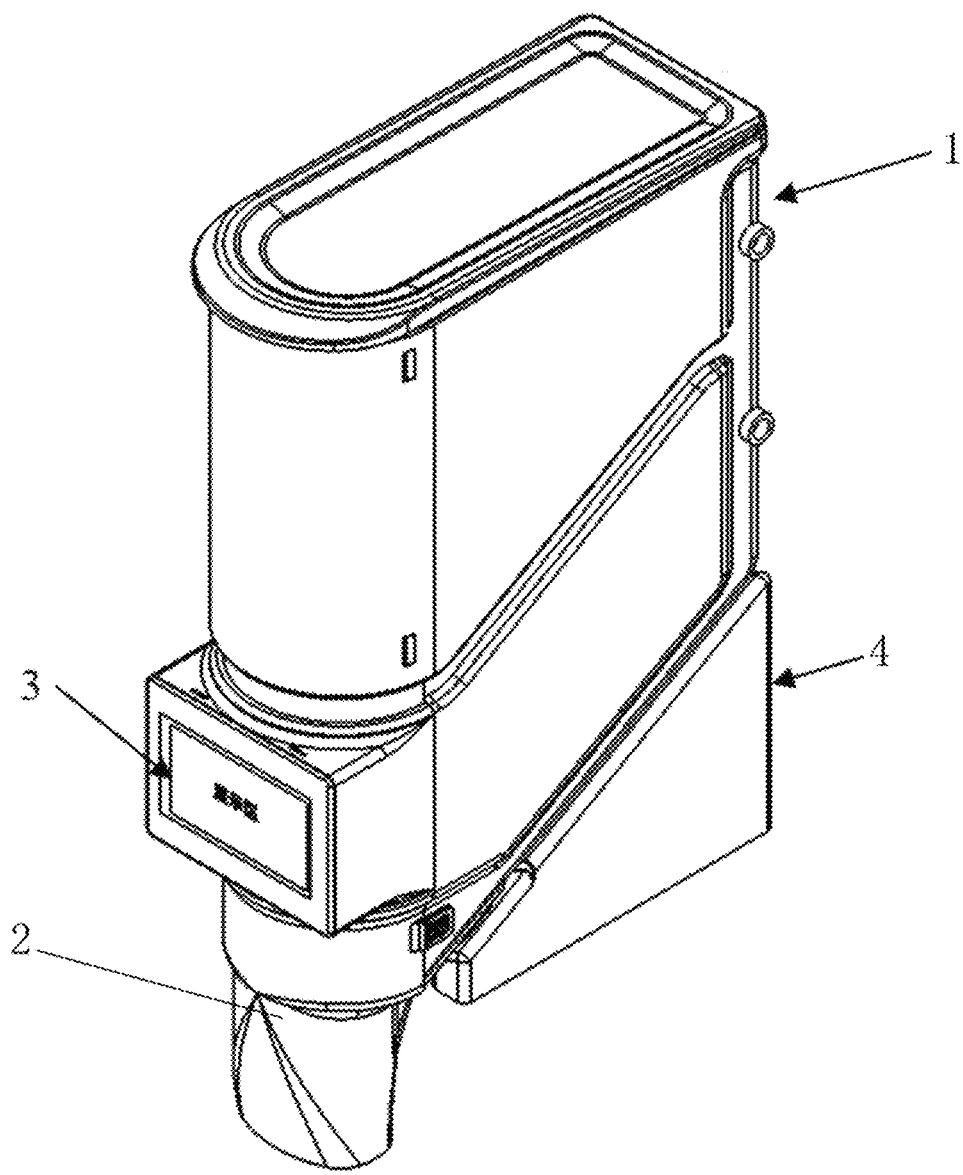
FIG. 1 is a schematic diagram of an external three-dimensional structure of a food gravity box according to the present invention.

Preferred embodiments of the present invention are further described below in conjunction with the accompanying drawings:

The present invention discloses a gravity-box-based snack vending apparatus, which is especially suitable for self-service vending of granular or powdered snacks, such as cereals, nuts, and small-particle candies, etc. An external three-dimensional structure diagram of the gravity-box-based snack vending apparatus is shown in FIG. 1, including a storage container 1 for storing snacks. This is a box body of the gravity box. There is a delivery module 2 for snack delivery below the box body. In other words, the snacks in the box, especially granular snacks, are blanked and delivered by the delivery module 2 under the action of gravity. A bottom of the storage container 1 is in communication with a material outlet of the delivery module 2. The delivery module 2 includes a discharging apparatus housing 21 and a transmission apparatus. The transmission apparatus includes a driving gear 222 driven by an external force, a driven gear 223 engaged with the driving gear 222, and a rotating wheel structure 224 coaxially rotating with the driven gear 223. The rotating wheel structure includes a rotating shaft 2245 and blades 2244 mounted on the rotating shaft. The rotating shaft 2245 and the blades are provided across a material outlet. When granular materials fall on the blades, two front and rear blades in a static state just block the material outlet. During discharging, the driving gear 222 is driven by the external force to drive the driven gear 223, the rotating wheel structure 224, and the blades 2244 to rotate, so as to pull out the material falling on the blades from below the material outlet.

Detailed structure diagrams of the delivery module 2 are shown in FIG. 2, FIG. 3, FIG. 5, FIG. 6, FIG. 7, and FIG. 8. In the figures, the blades 2244 include two sets of coaxially provided blades, and the two sets of blades are crossed and staggered in a lateral direction in FIG. 5, FIG. 7, and FIG. 8, and the two sets of blades 2244 are driven by the rotating shaft 2245 of the rotating wheel structure 224 to rotate simultaneously.

Figure 5:
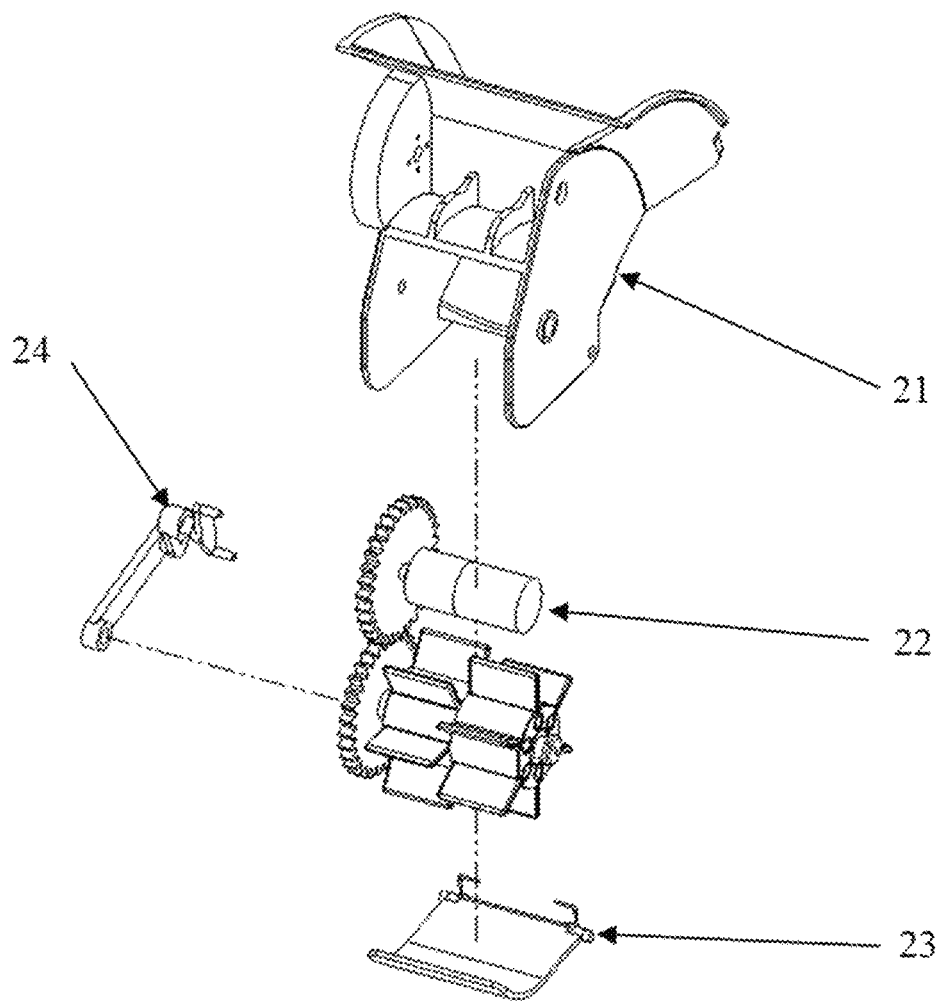
FIG. 5 is a schematic diagram of a disassembled structure of a discharging apparatus housing and a transmission part.
Figure 7:
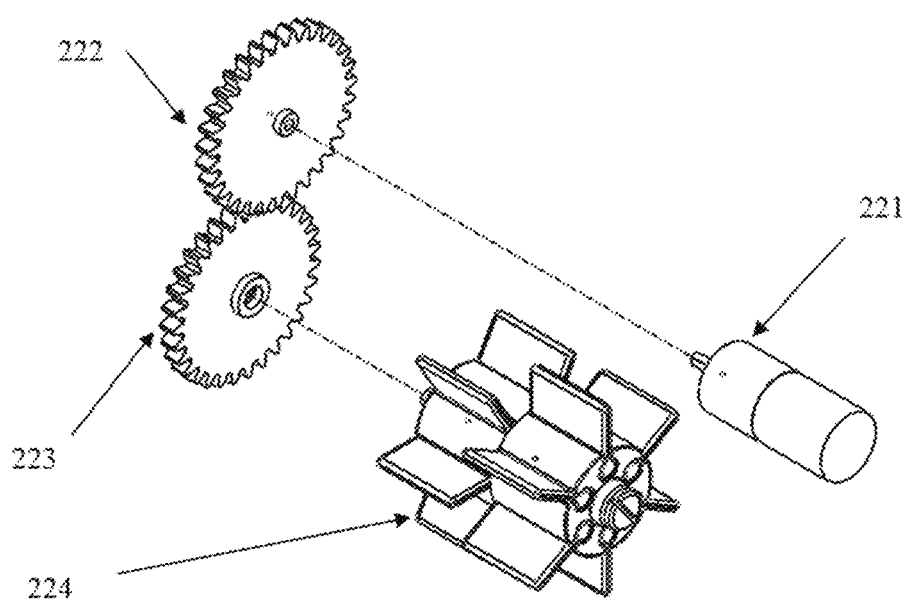
FIG. 7 is a schematic exploded diagram of main components of a transmission structure.
Figure 8:
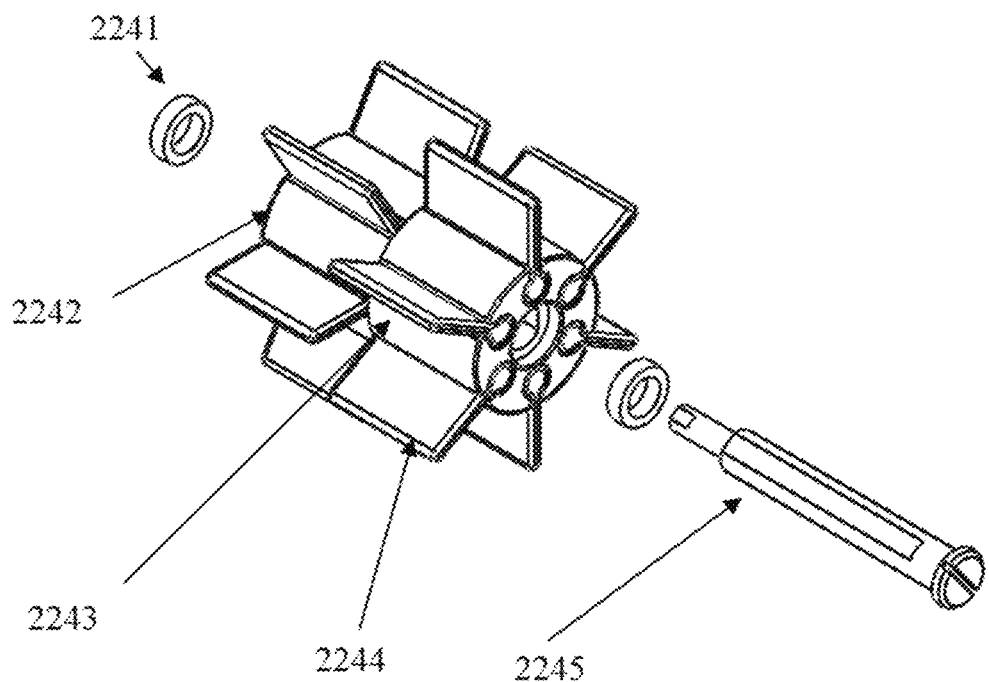
FIG. 8 is a schematic structural diagram of a rotating wheel structure.

The rotating wheel structure 224 in FIG. 5, FIG. 7, and FIG. 8 includes a sleeve 2241, a first wheel hub 2242 and a second wheel hub 2243 that are coaxially provided. The first wheel hub 2242 and the second wheel hub 2243 are connected by a rotating shaft 2245. One end of the rotating shaft 2245 is connected to the driven gear 223, and the other end is provided with a "linear" groove, that is, a linear groove at a right end of the rotating shaft 2245 in FIG. 8, which is convenient for disassembly and assembly. In the figures, the first wheel hub 2242 and the second wheel hub 2243 are cylindrical. Sinking grooves are formed in surfaces of the first wheel hub 2242 and the second wheel hub 2243. The grooves traverse the surfaces of the two wheel hubs and are big-end-up, and are distributed in the surfaces of the two wheel hubs around the rotating shaft. Insertion parts adapted to the grooves are provided at the bottoms of the blades 2244 and inserted from the outsides of the grooves, and the two wheel hubs are arranged at a certain angle, so that the two sets of blades 2244 inserted are and distributed in a staggered manner at a certain angle. The shaft sleeve 2241 is further provided in FIG. 8, and the shaft sleeve 2241 is placed in a counter bore on one side of the two wheel hubs, one side contacts the wheel hub and the other side contacts an inner wall of the discharging apparatus housing 21, so that there is a gap between the rotating wheel structure 223 and the discharging apparatus housing 21 to reduce friction. The rotating shaft 2245 is inserted into an inner hole of a rotating shaft limiting boss 219 on the discharging apparatus housing 21, the shaft sleeve 2241, waist holes of the first wheel hub 2242 and the second wheel hub 2243, and inner holes of a gear limiting, boss 214 to fix the rotating wheel structure in the discharging apparatus housing 21, so as to limit its axial movement.

A power source of the transmission apparatus is a motor 221. The motor 221 is fixed to the discharging apparatus housing 21 through a bolt and a motor mounting hole 213 provided on the discharging apparatus housing 21. A center of a circle of the driving gear 222 has, a first hole. The driving gear 222 is sleeved with a motor output shaft 22 through the first hole and is connected to the motor 221 through a bolt. The use of a motor for the transmission apparatus is only a suitable choice, and other common power sources in the prior art may be used for replacement.

Figure 3:
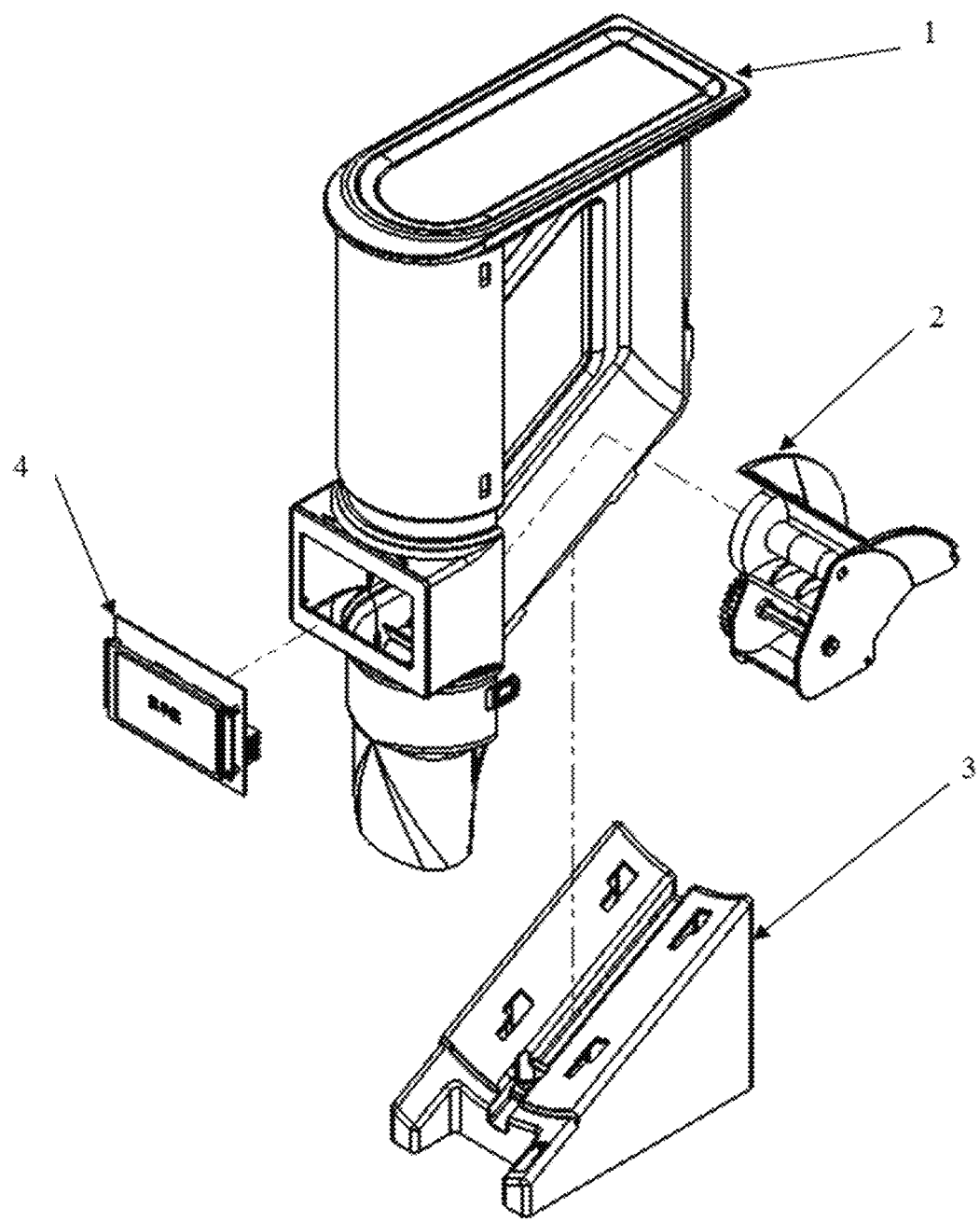
FIG. 3 is an exploded structural diagram of FIG. 1.

As shown in FIG. 3, in the figure, the motor 221 and the rotating wheel structure 224 are both mounted in an inner cavity of the discharging apparatus housing 21, and the driving gear 222 and the driven gear 223 are both located on an outer wall of the discharging apparatus housing 21.

Figure 9:
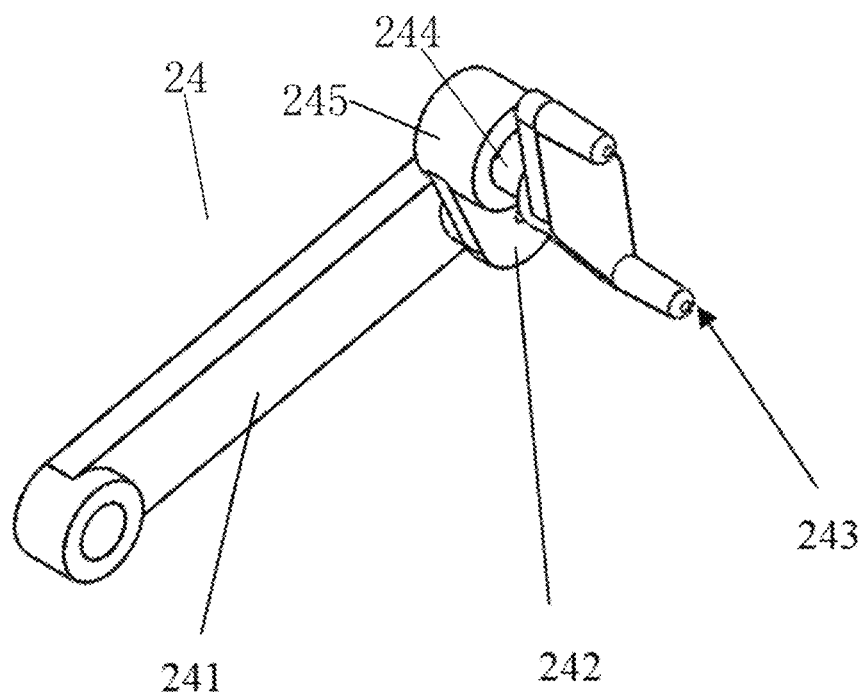
FIG. 9 is a schematic structural diagram of a stirring apparatus.
Figure 10:
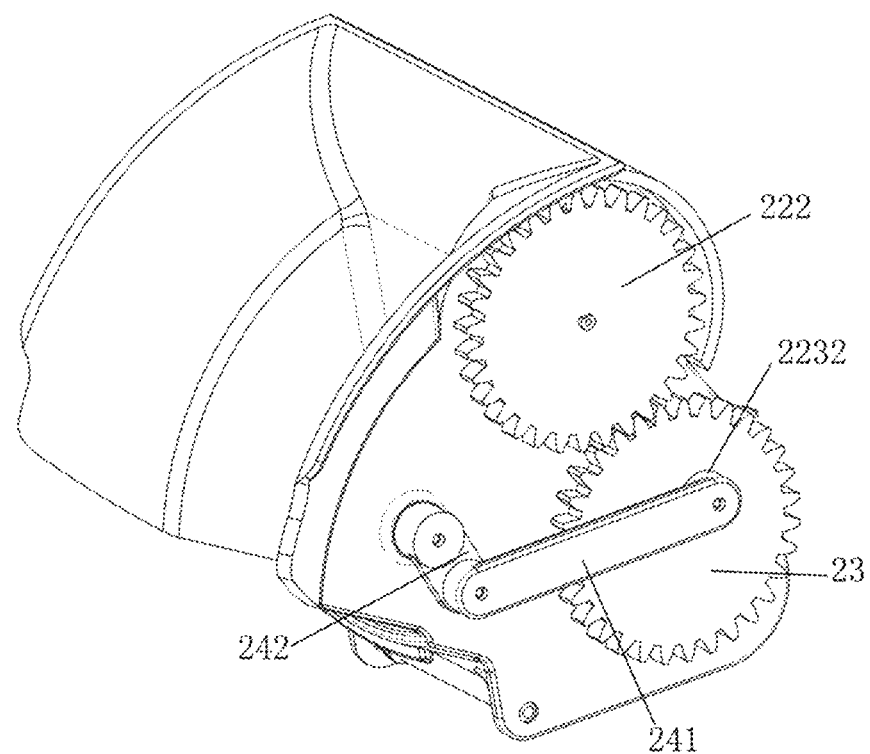
FIG. 10 is a schematic diagram of mounting of a stirring apparatus.
Figure 11:
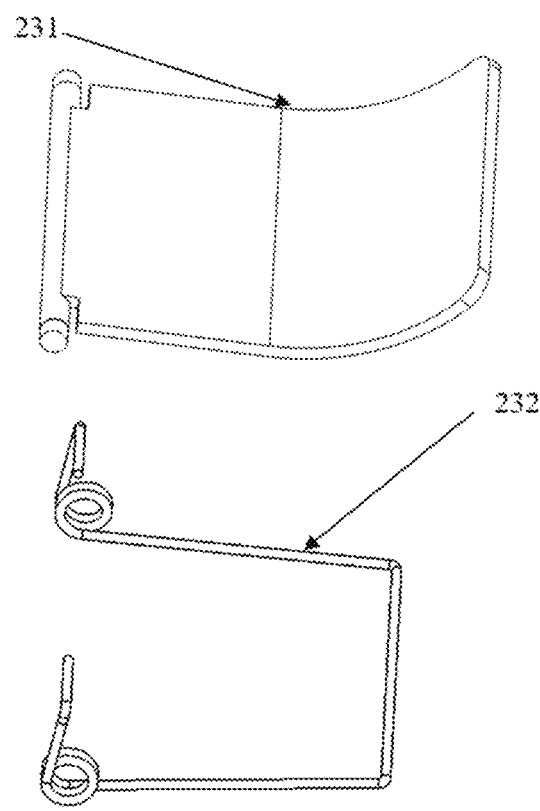
FIG. 11 is a structural exploded diagram of an elastic piece and a torsion spring in an anti-clamping apparatus.

Referring to FIG. 5 and FIG. 9, a stirring apparatus 24 for preventing accumulation of granular materials is further provided. The stirring apparatus 24 includes a connecting rod 241, a rocker 242, and a stirring rod 243. The driven gear 223 is provided with a driven gear limiting boss 2231 on the inside. The driven gear limiting boss 2231 is configured to perform coaxially limiting with the rotating shaft 2245 and the driven gear is provided with an eccentric boss 2232 on the outside. A second hole is formed in the eccentric boss 2232. One end of the connecting rod 241 is hinged with the second hole in the eccentric boss 2232 of the driven gear 223, and the other end of the connecting rod 241 extends diagonally upward and its inner side is hinged with an upper end of the rocker 242. The stirring rod 243 is hinged to the upper end of the rocker 242. The stirring rod 243 is located inside the discharging apparatus housing, and is provided with a limiting boss. A rotating pin 244 is provided at a center of a circle of the limiting boss, and a pin hole through which the rotating pin 244 passes is formed in the discharging apparatus housing 21. The rotating pin 244 is in clearance fit with the pin hole, and is hinged with the rocker 242 through the pin hole. The connecting rod 241 and the rocker 242 are located outside the discharging apparatus housing. The eccentric boss 2232 drives the connecting rod 241, the rocker 242, and the stirring rod 243 to form a crank rocker structure, so as to drive the stirring rod 243 to perform circular arc movement at a certain angle, to continuously disperse the materials accumulated in a stirring apparatus housing to prevent a hollow state due to accumulation and to stir materials accumulated in the discharging apparatus housing 21.

Figure 6:
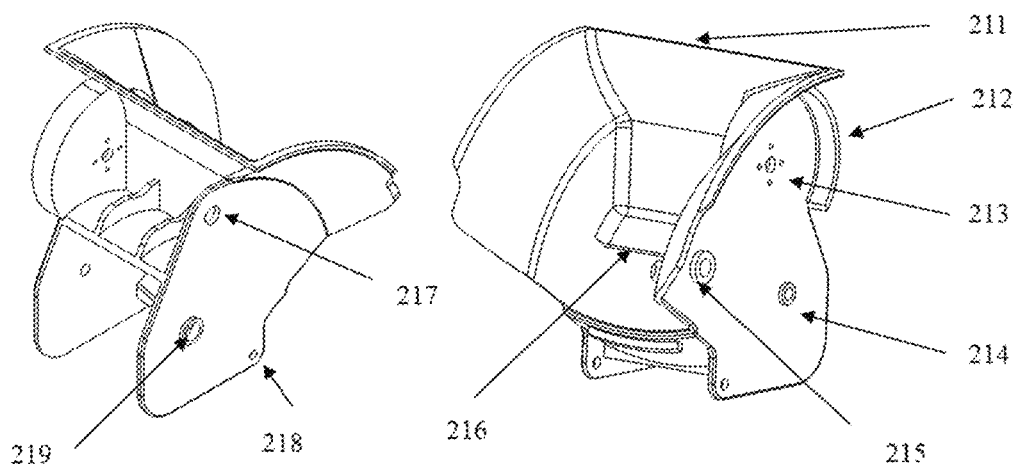
FIG. 6 is a schematic diagram of an exploded structure of the discharging apparatus housing from two different perspectives.

The other end of the rocker 242 is provided with a limiting boss 245. The limiting boss, the limiting boss on the stirring rod, a first limiting boss 215 on the discharging apparatus housing 21, and a inner wall of a diversion structure 211 together play a limiting role to prevent the stirring rod 243 from moving axially. FIG. 6 shows that a stirring apparatus housing is divided into front and rear cavity-like spaces by a partition in the middle. A motor is mounted in an upper part of the front space, and a rotating wheel structure is mounted in a lower part of the front space, hole positions 213 and 217 are motor mounting positions, a hole position 219 is a rotating shaft limiting boss, that is, a rotating wheel structure mounting position, 216 is a rotating wheel protection structure, and a space above and outside is a stirring apparatus mounting position.

An inner cavity of the storage container 1 is provided with a material falling inclined surface 154. The material falling inclined surface 154 is at a certain angle with a horizontal plane, and a lower end of the material falling inclined surface 154 is layered in a stepped manner and a discharging port is formed in the lower end of the material falling inclined surface. A delivery module limiting groove 155 is formed in the discharging port. A delivery module 2 is mounted.

The discharging apparatus housing is provided with a horn-shaped diversion structure 211. As shown in FIG. 6, the diversion structure 211 is attached to an inner wall of the storage container and the material falling inclined surface through a delivery module mounting position and the limiting groove to prevent material leakage. A material inlet of the discharging apparatus housing is provided with an arc-shaped plate like rotating wheel protection structure 216. The rotating wheel protection structure 216 partially covers an upper part of the rotating wheel structure, to prevent clamping of the rotating wheel caused by accumulation of a large amount of materials.

One side of the discharging apparatus housing is provided with a wiring hole, an elastic piece mounting hole, and a rotating shaft limiting boss. The wiring hole is configured to place a power line of a motor, a data line, and a power line of a circuit board. A rotating shaft limiting boss, a driven gear limiting, boss and a gear limiting boss on the discharging apparatus housing together play a role in axial positioning of the rotating shaft.

The other side of the discharging apparatus housing is provided with a motor mounting hole, a first limiting boss, a gear limiting boss, and a gear protective cover. The gear protective cover can prevent the power line and the data line from winding a gear.

An anti-clamping apparatus 23 is further included. The anti-clamping apparatus includes an elastic piece 231 and a torsion spring 232. A front half of the elastic piece 231 is a straight plate, and a rear half of the elastic piece is an arc surface. A rotating shaft is provided at a head end of the elastic piece 231, and limiting grooves of the torsion spring are formed near the rotating shaft to prevent the elastic piece 231 from moving axially. One end of a short arm of the torsion spring contacts an outer wall of the diversion structure 211, and one end of a long arm of the torsion spring contacts the elastic piece 231. Winding parts of the torsion spring sleeve the limiting grooves of the torsion spring 232 of the elastic piece. The elastic piece 231 is mounted to the discharging apparatus housing 21 through an elastic piece mounting hole 218 in the discharging apparatus housing 21. When excessive materials enter, the elastic piece 231 is pushed away from the rotating wheel 224 to prevent clamping. When less material enters, the elastic piece 231 is close to the blades 2243 of the rotating wheel under the action of the torsion spring 232.

A lower part of the delivery module housing is provided with an arc-shaped elastic piece limiting structure to prevent the torsion spring from being deformed excessively and unable to restore to its original shape.

Figure 4:
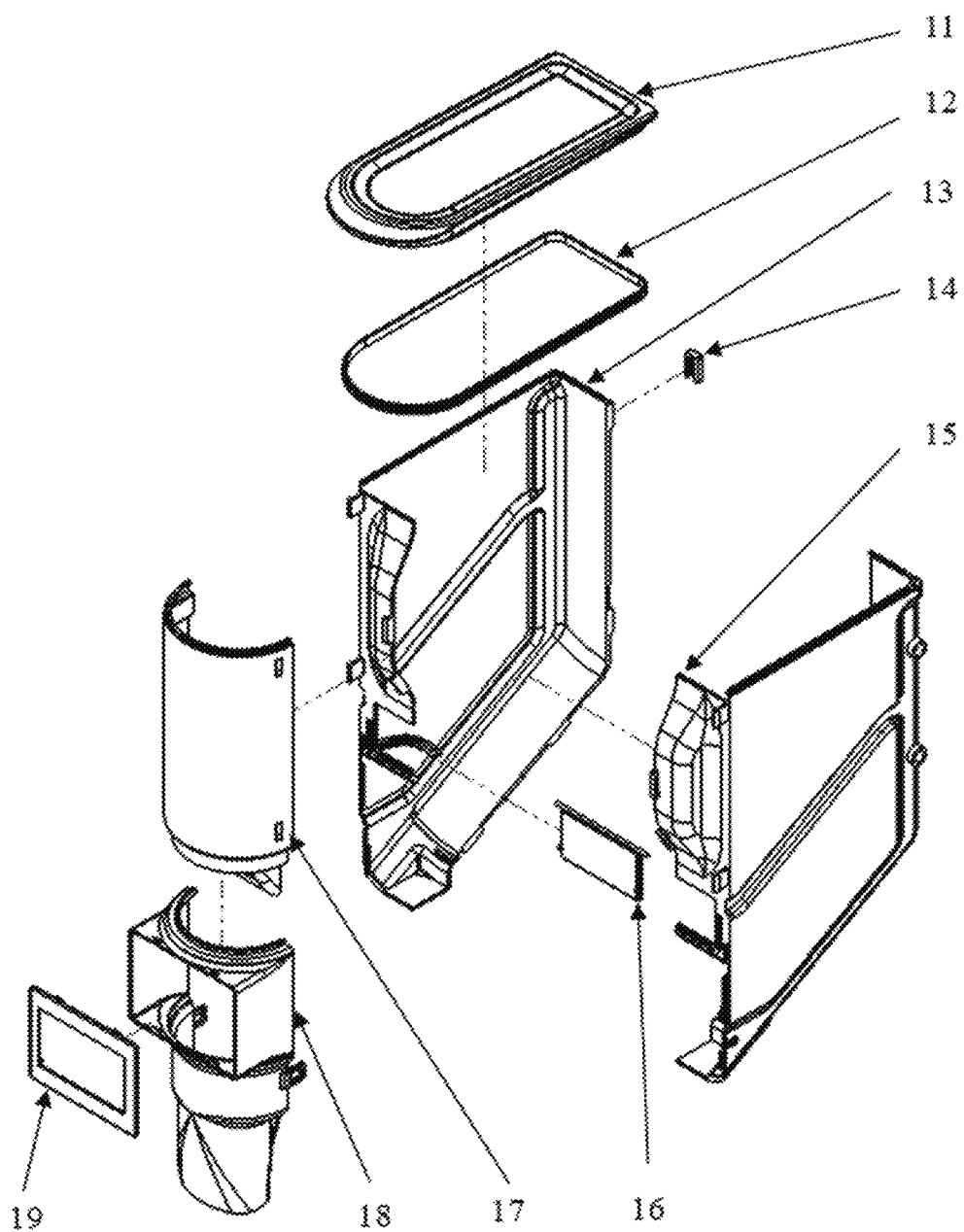
FIG. 4 is an exploded diagram of a storage container 1 and its partial internal structure.

As shown in FIG. 4, the storage container 1 includes an upper cover 11 and a lower housing. The lower housing includes a left container housing 13 and a right container housing 15. The left container housing 13 and the right container housing 15 are buckled as a whole through a buckle 14, and a sealing gasket 12 is provided between the upper cover and the lower housing.

Figure 2:
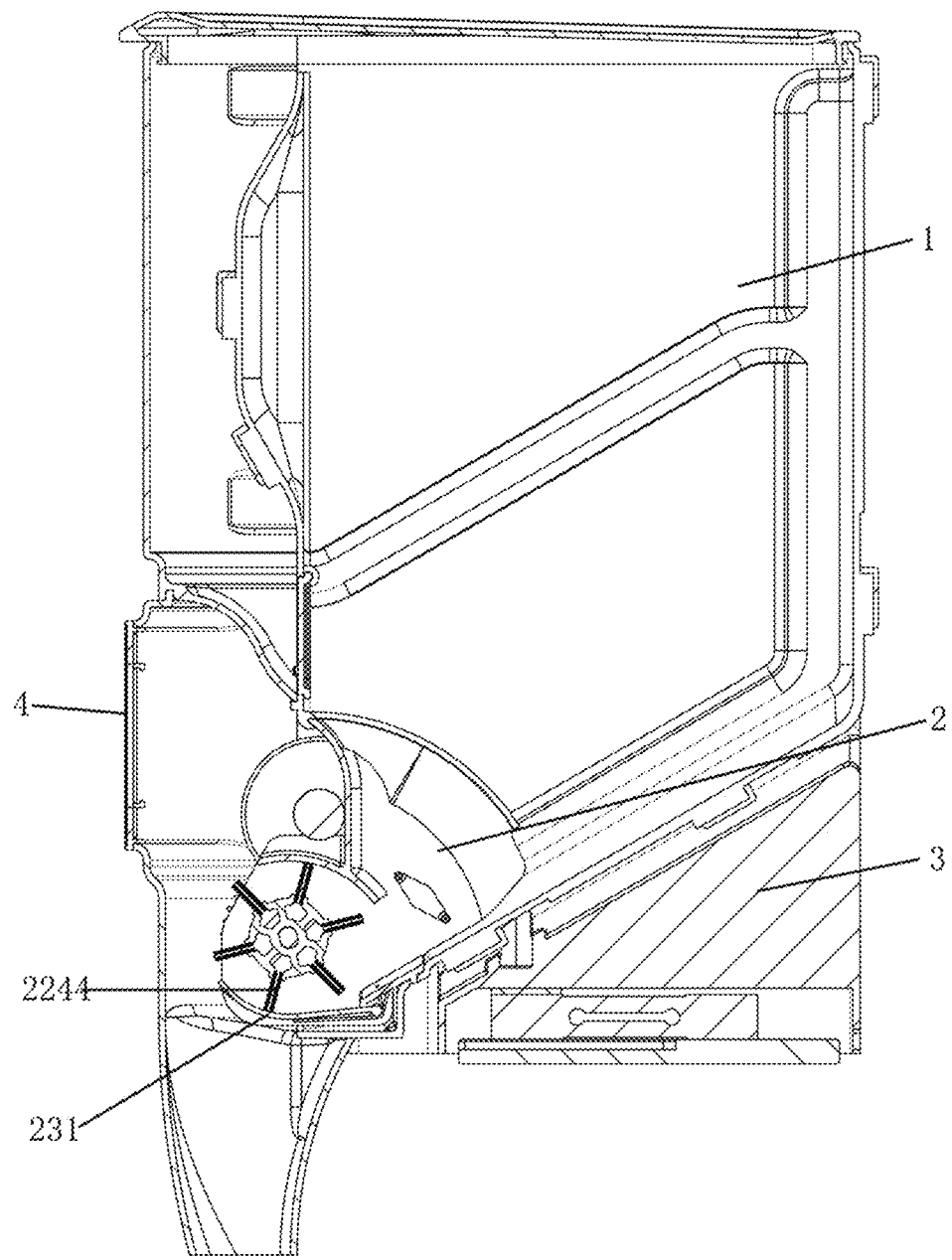
FIG. 2 is a schematic sectional diagram of the structure of FIG. 1.

As shown in FIG. 2, FIG. 3, and FIG. 4, the storage container 1 further includes a display cabin 17. The display cabin 17 has an arc-shaped plate structure protruding forward and a display gap is formed between the display cabin 17 and a front outer wall of the lower housing of the storage container 1, and a discharging nozzle 18 is provided under the display cabin 17.

A bulge 1701 protruding forward is provided at a front outer wall of the storage container. A baffle 16 is provided at a lower end of the bulge 1701. Rotating shafts 1601 are provided at both ends of the baffle 16. A lower end of the baffle 16 is matched with the bottom of the display cabin, and the baffle is limited by a bottom contour of the display cabin and can only be rotated toward a direction of a food cabin. In this way, food accumulated in a long term in the display cabin pushes the baffle 16 away by external forces such as pressing and squeezing from above to enter the food cabin, which is helpful for regular cleaning of the food in the display cabin.

A mechanical part of the gravity-box-based snack vending apparatus of the present invention is described in detail. Preferably, the gravity-box-based snack vending apparatus of the present invention further includes a metering module 3 and a control module 4. The metering module 3 is, located below the storage container 1 and is composed of a base 31, a spacer 32, a weighing sensor 33, and a mounting base plate 34. The storage container is provided on the base 301, a weight change of the storage container 1 is measured by the weighing sensor for price calculation. The control module 4 includes a central controller 5, a wireless communication module 7, and a payment module. After the metering module generates and displays a price, a payment interface appears. After a user pays, an instruction is sent, by the control module, to the motor 1 to drive the motor 1 to start the delivery module 2 for delivering goods. A ziplock bag may be set under the delivery module. When delivery is completed, the ziplock bag is automatically sealed or self-sealed. Under the action of the metering module and the weighing module, the present invention implements fully automatic operation from metering to delivery. A mounting base plate 34 is provided with a groove at one end to allow the weighing sensor to work normally. Several mounting holes are distributed on the mounting base plate to mount the weighing sensor.

Figure 12:
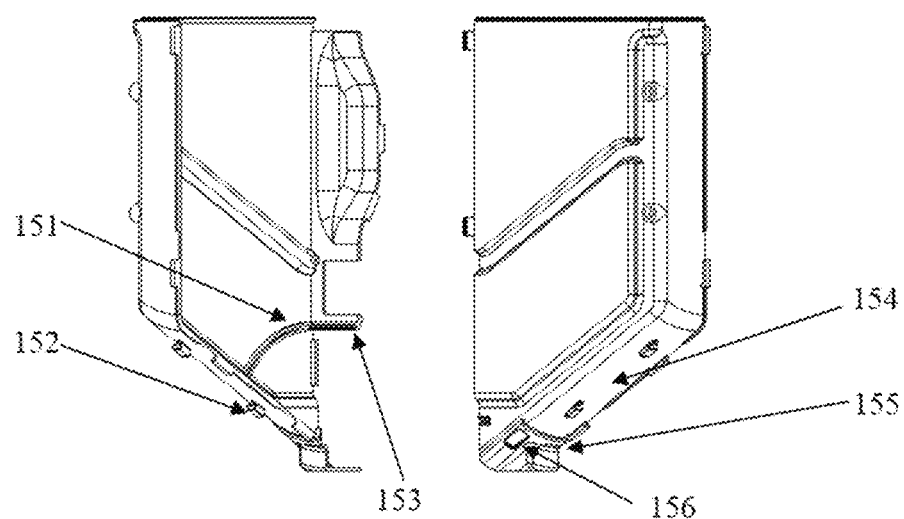
FIG. 12 is a schematic structural diagram of a right container housing.
Figure 13:
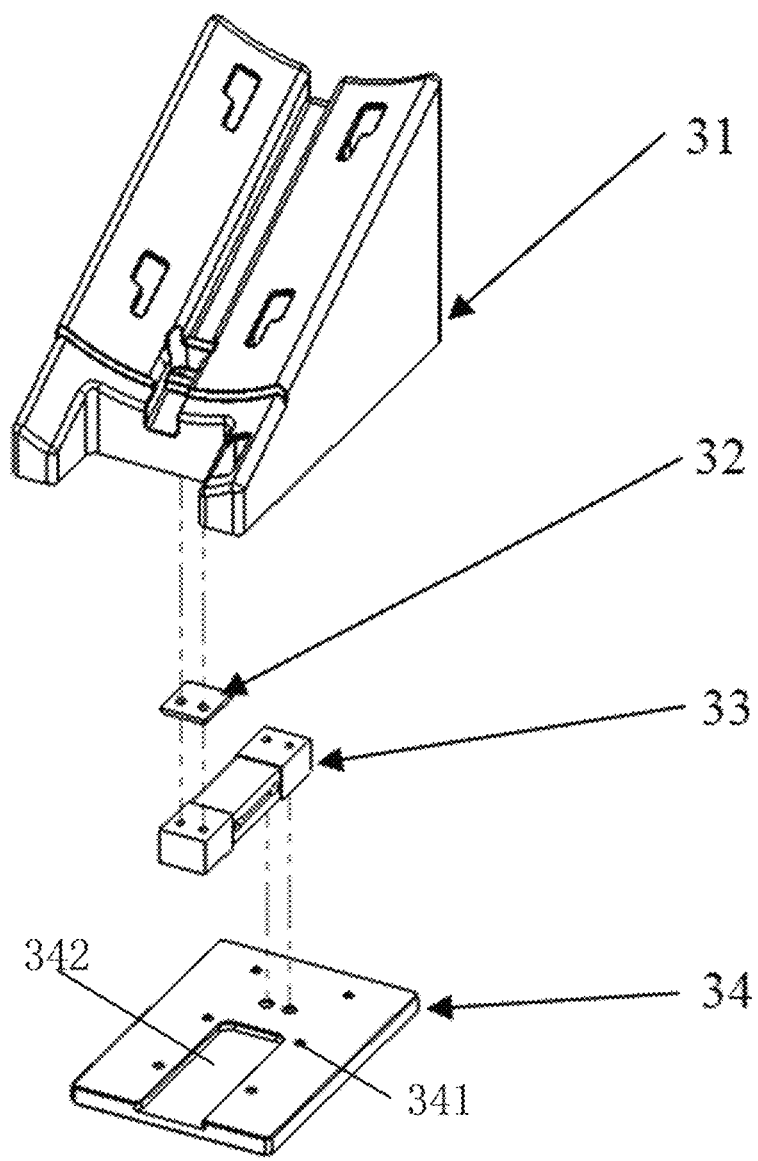
FIG. 13 is a schematic mounting diagram of a base and a mounting base plate.
Figure 14:
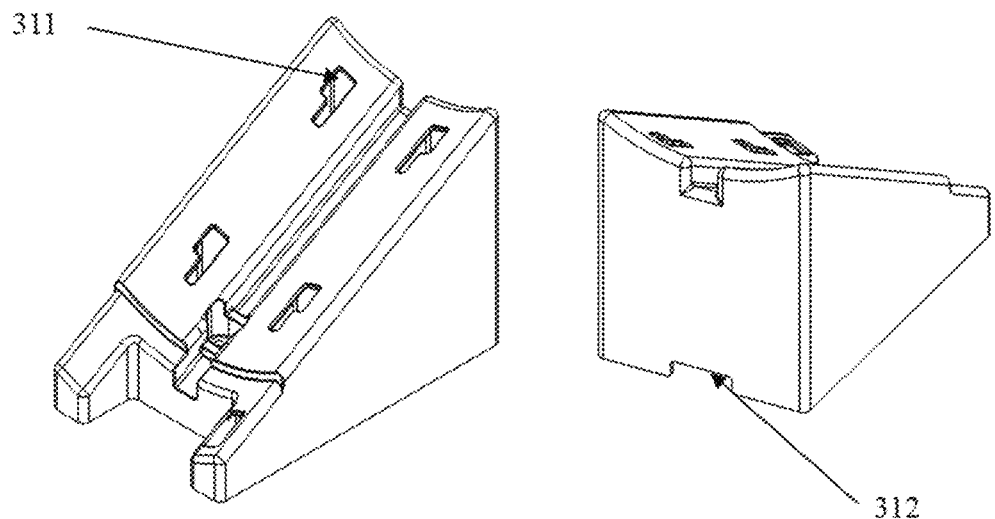
FIG. 14 is a schematic structural diagram of a base.
Figure 15:
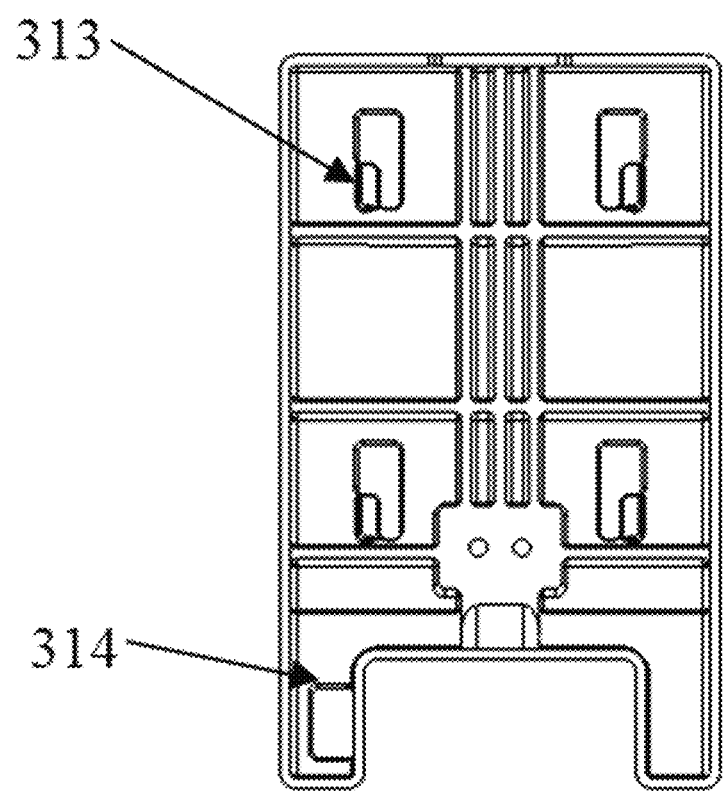
FIG. 15 is a top view of the base.

As shown in FIG. 13 and FIG. 14, a contact surface between the base 31 of the metering module and the storage container 1 is an arc surface. An elongated groove of a certain width is formed in a middle of the arc surface. A bolt mounting hole is formed at an end of the groove. An end of the arc surface is stepped in a descending manner and in a U shape. A square hole is formed in a side of "a U-shaped portion" for wiring. A square groove 312 is formed in bottom of a back of the base of the metering, module for arrangement of a power line and a data line. A fixing hole 311 is further formed in the arc surface of the base 31 for clamping and fixing with the base 31. The fixing hole 311 is located at a position, close to the elongated groove, of the arc surface of the base of the metering module. A narrow and square end of the fixing hole 311 is a limiting end. A wider and square head end of the fixing hole is a mounting buckle insertion end of the storage container. A matching mounting buckle is provided at the bottom of the storage container to fix the storage container. A boss 313 parallel to the horizontal plane is provided at a back of the fixing hole 311. The boss cooperates with the mounting buckle of the storage container to limit the storage container. The mounting buckle 152 is shown in FIG. 12. At the bottoms of the left container housing and the right container housing of the storage container, the mounting buckle 152 has an "L" shape, and a short side of the "L" shape is parallel to the horizontal plane.

A discharging port of the right container housing of the storage container is provided with a container wall wiring hole 156, which cooperates with a square groove on the base for arrangement of a power line and a data line.

Figure 16:
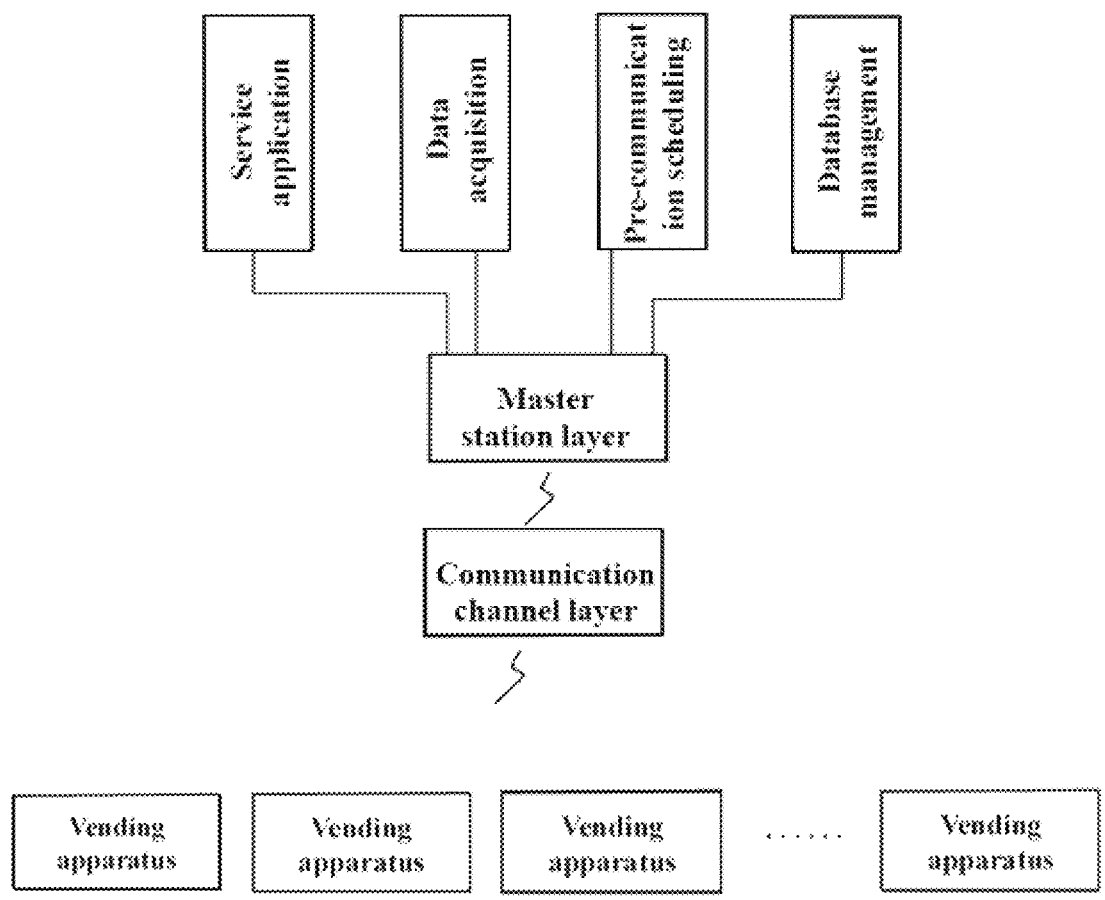
FIG. 16 is a network principle diagram of a network vending system using the vending apparatus of the present invention.

The gravity-box-based snack vending apparatus of the present invention is described above in detail, and the automatic control system of the metering module 3 and the control module 4 is added. Preferably, the present invention can be further expanded to a network-based vending system, including a master station layer, a communication channel layer, and a terminal device layer composed of various vending apparatuses. The master station layer is divided into a service application module, a data acquisition module, a pre-communication scheduling module, and a database management module. The service application module implements various application services of the system. The services specifically include online payment, online ordering, nutritional composition analysis, food matching recommendations, and data analysis. The data acquisition module acquires information about goods sold in the gravity box, and is responsible for protocol analysis. The pre-communication scheduling module manages and dispatches various remote communication methods with the terminal. The communication channel layer is a link between a master station and a concentrator, and a link between the concentrator and a gravity box device, and provides a variety of available wired and wireless communication channels, so as to provide a communication link for information exchange between the master station and the terminal. The mainly used communication channels include: LoRa wireless communication, GPRS/CDMA wireless public network, Ethernet, and WiFi. The terminal device layer is responsible for collecting and providing original goods information of the entire system and the vending control of the goods. FIG. 16 shows a system principle diagram of the network vending system of the present invention.

The terminal device layer is divided into a data acquisition sublayer and a vending device sublayer, and includes a vending apparatus body and a data acquisition concentrator mounted in the vending apparatus. The data acquisition sublayer collects information about the vending device, processes and freezes related data, implements interaction with an upper master station, and implements conversion of communication channels and communication protocols. The vending device sublayer implements goods metering and vending.

The data acquisition sublayer uses a time-sharing data acquisition communication method. Communication content includes: receiving a goods information modification instruction from the concentrator, parsing the related instruction and updating content in a corresponding display area and storage area data; uploading real-time goods vending data, actively reporting faults (such as motor jam, inaccurate measurement, etc.) related to the gravity box and device status (product stockout, etc.).

The vending device terminal system is composed of a microcontroller, a motor, a motor drive circuit, a LoRa communication module, a touch screen, and a weighing module. The LoRa module implements communication with the data acquisition concentrator. Data acquired by the weighing sensor of the metering, module is converted by its built-in algorithm and then transmitted to a payment, module. The payment module includes a user-oriented APP. The APP includes online ordering, goods recommendation, and goods query modules. After payment by the payment module, an upper computer sends a delivery instruction to start the motor drive circuit to drive the motor for delivery.

The data acquisition concentrator is configured to connect the vending apparatus terminal with the master station layer, and performs conversion of data communication channels and the communication protocols in communication. Main functions of the concentrator can be summarized as follows.

a. Having good data management and mobile data storage capabilities. Each data concentrator can manage 200 gravity boxes under full load. The concentrator stores numbers and short-term transaction records of 200 gravity boxes and other information according to a certain storage rule, and establishes response archives for the gravity boxes. The concentrator performs data reading and related operations of the gravity box according to a storage order of the archives. In order to meet data storage requirements, the system uses 2G nand flash as a data memory to ensure the data storage requirements.

b. Implementing the conversion of communication channels. The gravity boxes use the LoRa communication method, which cannot directly transmit data with the master station, but uses a concentrator for channel conversion. The gravity box transmits data with the concentrator through LoRa communication, and the concentrator transmits the data to a front-end computer of the master station through Ethernet or WIFI. In order to ensure this function, 2-way LoRa communication modules and 1-way Ethernet circuit and WIFI circuit are designed for concentrator hardware.

c. Implementing conversion of communication protocols. Due to different communication channels, the amount of transferred data and data types are different, and different data communication protocols are used between the gravity box and the concentrator, and between the concentrator and the master station. The concentrator needs to parse a data frame uploaded by the gravity box and a data frame sent by the master station separately, and after the parsing, the data frame is reorganized and then sent or uploaded. The concentrator plays a hub and bridge role in protocol conversion.

d. Using advanced time-sharing data acquisition and communication methods. Due to a large number of gravity boxes managed by each concentrator and randomness of goods bought by customers, this randomness leads to uncertainty in data time and uploaded quantity There may be multiple customers buying goods simultaneously, and multiple gravity boxes uploading data simultaneously. How to, avoid communication congestion and data loss during communication is the key to system design. A time-sharing acquisition method is designed for this system to ensure reliability of data, communication. This approach contains several key points: (a) purchase information is not actively uploaded in order to avoid communication congestion. When the gravity box generates a new transaction record, the new transaction record is stored first, waiting for being obtained by the concentrator actively. The concentrator obtains data from all gravity boxes in a TDMA time-sharing method to ensure unblocked data communication. (b) In order to ensure smooth operation of the system, the gravity boxes and, the concentrator have the function of actively reporting faults, and the reporting must be achievable. The faults, are set with different priorities, and a fault with a higher priority are reported first and processed first.

The data acquisition sub-module acquires information about a to-be-sold device, processes and freezes related data, implements the interaction with the upper master station, and implements, in the time-sharing data acquisition communication method, the conversion of communication channels and communication protocols. The communication content includes: receiving, a goods information modification instruction from the concentrator, parsing the related instruction and updating content in a corresponding display area and storage area data; uploading real-time goods vending data, actively reporting faults related to, the gravity box (such as motor jam, inaccurate measurement, etc.) and device status (product stockout, etc.). (2) A 6-inch high-definition (800*480) LCD touch color screen is used, and a humanized operation interface is designed, through the operation interface, people can know information about goods (nutrient composition, best combination, and efficacy, etc.), and the gravity box is operated through the operation interface for goods purchase. (3) Automatic delivery and weight measurement are provided, when a user enters the amount of items needed and clicks to buy, the gravity box drives a mechanical structure through a control motor to perform delivery, and under the function of a PID algorithm specially debugged by the system, the gravity box delivers goods fast and controls a delivery amount error accurately, so that the error between the delivery amount and an input target amount is ±10 g, and measurement accuracy of the gravity box may reach ±1 g.

The vending terminal device layer of the vending apparatus has certain data storage and fault self-diagnosis capabilities. The data storage capability can ensure that the sales data is not lost in the event of a communication fault, and the gravity box can save the sales data within 3 days. The fault self-diagnosis capability can ensure that the system can be repaired in time in the event of a fault, and normal business and supply requirements of a supermarket can be guaranteed.

The network vending system uses an ASA architecture and includes a cloud platform service system, a master control platform, a franchisee subsystem, a distributor subsystem, and a sales terminal composed of vending apparatuses, and uses Internet of Things. Device operation data, product inventory data, product sales data, and user behavior data of the main control platform, the franchisee subsystem, the distributor subsystem, and the sales terminal are transmitted to the cloud through terminals for storage, and each role acquires different data and processes different operations according to the division of labor. Each subsystem uses a distributed database to unify a database platform.

The present invention uses the ASA architecture. This architecture is a change-oriented service process, a change-oriented organization, and a changing management model, and has the following characteristics.

1. A unified database platform: multiple subsystems in this system use distributed databases to unify one database platform.
2. Dynamic permission management: user groups are developed separately in a tree-like manner, and user permission can be directly divided by, groups or redefined.
3. Intelligent functional interface means: different personnel may have different and proprietary window interfaces according to assignment of different permissions to each user.
4. An object-oriented design idea: a service processing process is combined with service processing data to form an object structure. Objects are categorized and an inheritance relationship is established, so as to extract commonalities of several system services to form a public class library.

5. Minimizing costs of software upgrades: a possibility of software changes is reduced through flexible settings, so as to increase practicability of the software, increase vitality of software use, and reduce costs of software modification and maintenance.

Main functions of background software of the present invention are shown as follows:

| No. | Function module | Function category | Function description |
| --- | --- | --- | --- |
| 1 | Device management | Area (Outlet) management | Manage each community where a device is deployed, and record a geographic location, population, and community situation of the community for later statistical analysis |
| 2 | | Device management | Manage information such as device identification, operation status, configuration parameters, network parameters, and an area to which the device belongs |
| 3 | | Maintenance work order record | Report, perform feedback on, and track device fault information submitted by a member or a worker |
| 7 | Distributor management | Distributor review configuration | The member may fill in application information and apply to becoming a distributor |
| 8 | | Distributor management | Manage and configure rebates for a user who becomes a distributor |
| 9 | | Distributor permission configuration | Set a background operation permission of the distributor |
| 17 | Sales management | Goods classification management | Create goods classification |
| 18 | | Goods management | Manage basic goods information such as a name, inventory, a price, a cost, a membership level price, and a device to which the goods belongs |
| 19 | | Goods inventory warning | Perform warning reminding for goods that are lack of stock |
| 20 | | Order management | Inquire all transacted orders |
| 21 | | Transaction detail management | Inquire all transaction details |
| 22 | | Profit report statistics | Customize the query of profit statements by day, week, month, etc. |
| | | Deposit withdrawal management | Inquire and process a deposit withdrawal application of a merchant |
| 30 | Article center | Notice | Issue notice and announcement information |
| 31 | | Help center | Issue system help information |
| 32 | Statistical report | Device layout | Omit |
| 33 | | Sales profit chart | Omit |
| 34 | | Sales performance distribution chart | Omit |
| 35 | | Distributor performance statistics | |
| 36 | | Points Statistical Chart | |
| 37 | Basic configuration | Payment configuration | Set a payment method, a payment secret key, and other configurations, and connect to third-party payment |
| 38 | | System parameter configuration | Configure system operation parameters |
| 39 | | Organizational structure management | Set up a platform organization structure and clarify a function of each role |
| 40 | | Dual permission management based on operation and data | Set permissions for each user through roles |
| 41 | | System log management | Inquire system logs |
| 42 | | External data interface (development according to demands) | External interface for other systems to call |
| 43 | | Database backup and recovery | Database backup and recovery |

The present invention implements detailed statistics and analysis on user behavior data, goods inventory, sales data, device health status feedback, and market operation data, and provides a plurality of interfaces to provide other companies, platforms, and individuals with more accurate and detailed big data as a basis for decision making.

Although the technical solutions of the present invention have been described and listed in more detail, it is understood that it is obvious for those skilled in the art to modify the above-mentioned embodiments or use equivalent alternatives, and these modifications or improvements made without departing from the spirit of the present invention all belong to the scope of protection of claimed by the present invention.

What is claimed is:

1. A gravity-box-based snack vending apparatus, comprising a storage container for storing snacks, and a delivery module, a bottom of the storage container being in communication with a material outlet of the delivery module, wherein the delivery module comprises a discharging apparatus housing and a transmission apparatus: the transmission apparatus comprises a driving gear driven by an external force, a driven gear engaged with the driving gear, and a rotating wheel structure coaxially rotating with the driven gear; the rotating wheel structure comprises a rotating shaft and blades mounted on the rotating shaft: the rotating shaft and the blades are provided across a material outlet: when granular materials fall on the blades, two front and rear blades in a static state just block the material outlet; and during discharging, the driving gear is driven by the external force to drive the driven gear, the rotating wheel structure and the blades to rotate, so as to pull out the granular materials falling on the blades from below the material outlet;

wherein an inner cavity of the storage container is provided with a material falling inclined surface being at a certain angle with a horizontal plane; a lower end of the material falling inclined surface is layered in a stepped manner; a discharging port is formed in the lower end of the material falling inclined surface; a delivery module limiting groove is formed in the discharging port; and the delivery module is mounted on the discharging port.

2. The gravity-box-based snack vending apparatus according to claim 1, wherein the blades comprise two sets of coaxially provided blades which are crossed and staggered in a transverse direction, and the two sets of blades are driven by the rotating shaft of the rotating wheel structure to rotate simultaneously.

3. The gravity-box-based snack vending apparatus according to claim 2, wherein the rotating wheel structure comprises a shaft sleeve, and a first wheel hub and a second wheel hub that are coaxially provided: the first wheel hub and the second wheel hub are connected by the rotating shaft: sinking grooves are formed in surfaces of the first wheel hub and the second wheel hub: the grooves traverse the surfaces of the two wheel hubs and are big-end-up, and are distributed in the surfaces of the two wheel hubs around the rotating shaft: insertion parts adapted to the grooves are provided at the bottoms of the blades and inserted from the outsides of the grooves; and the two wheel hubs are arranged at a certain angle, so that the two sets of blades inserted are distributed in a staggered manner at a certain angle.

4. The gravity-box-based snack vending apparatus according to claim 1, wherein a power source of the transmission apparatus is a motor, the motor being fixed on the discharging apparatus housing, a center of circle of the driving gear having a first hole, and the driving gear being sleeved with a motor output shaft through the first hole and being connected to the motor.

5. The gravity-box-based snack vending apparatus according to claim 1, further comprising a stirring apparatus for preventing accumulation of granular materials, wherein the stirring apparatus comprises a connecting rod, a rocker, a stirring rod: the driven gear is provided with a driven gear limiting boss on the inside and an eccentric boss on the outside: a second hole is formed in the eccentric boss: one end of the connecting rod is hinged with the second hole in the eccentric boss of the driven gear: the other end of the connecting rod extends diagonally upward and its inner side is hinged with an upper end of the rocker; the stirring rod is hinged to an upper end of the rocker: the stirring rod is located inside the discharging apparatus housing, and provided with a limiting boss: a rotating pin is provided at the center of circle of the limiting boss: a pin hole through which the rotating pinpasses is formed in the discharging apparatus housing: the rotating pin is in clearance fit with the pin hole and is hinged with the rocker through the pin hole: the connecting rod and the rocker are located outside the discharging apparatus housing; and the eccentric boss drives the connecting rod, the rocker, and the stirring rod to form a crank rocker structure, so as to drive the stirring rod to perform circular arc movement at a certain angle to stir materials accumulated in the discharging apparatus housing.

6. The gravity-box-based snack vending apparatus according to claim 5, wherein the other end of the rocker is provided with a limiting boss, the limiting boss, the limiting boss on the stirring rod, a first limiting boss on the discharging apparatus housing, and an inner wall of a diversion structure together playing a limiting role to prevent the stirring rod from moving axially.

7. The gravity-box-based snack vending apparatus according to claim 1, wherein the discharging apparatus housing is provided with a horn-shaped diversion structure that is attached to an inner wall of the storage container and the material falling inclined surface through a delivery module mounting position and the limiting groove to prevent material leakage; and a material inlet of the discharging apparatus housing is provided with an arc-shaped plate like rotating wheel protection structure which partially covers an upper part of the rotating wheel structure.

8. The gravity-box-based snack vending apparatus according to claim 1, further comprising an anti-clamping apparatus which comprises an elastic piece and a torsion spring, wherein a front half of the elastic piece is a straight plate: a rear half of the elastic piece is an arc surface: a rotating shaft is provided at a head end of the elastic piece: limiting grooves of the torsion spring are formed near the rotating shaft to prevent the elastic piece from moving axially: one end of a short arm of the torsion spring contacts an outer wall of the diversion structure: one end of a long arm of the torsion spring contacts the elastic piece: winding parts of the torsion spring sleeve the limiting grooves of the torsion spring of the elastic piece: the elastic piece is mounted to the discharging apparatus housing through an elastic piece mounting hole in the discharging apparatus housing; and when excessive materials enter, the elastic piece is pushed away from the rotating wheel to prevent clamping, and when less materials enter, the elastic piece is close to the blades of the rotating wheel under the action of the torsion spring.

9. The gravity-box-based snack vending apparatus according to claim 1, wherein the storage container comprises an upper cover and a lower housing, the lower housing comprises a left container housing and a right container housing, the left container housing and the right container housing are buckled as a whole through a buckle, and a sealing gasket is provided between the upper cover and the lower housing.

10. The gravity-box-based snack vending apparatus according to claim 9, wherein the storage container further comprises a display cabin: the display cabin has an arc-shaped plate structure protruding forward: a display gap is formed between the display cabin and a front outer wall of the lower housing of the storage container; and a discharging nozzle is provided under the display cabin.

11. The gravity-box-based snack vending apparatus according to claim 10, wherein a bulge protruding forward is provided at a front outer wall of the storage container: a baffle is provided at a lower end of the bulge: rotating shafts are provided at both ends of the baffle; and a lower end of the baffle is matched with the bottom of the display cabin.

12. The gravity-box-based snack vending apparatus according to claim 1, further comprising a metering module and a control module, wherein the metering module is located below the storage container and is composed of a base, a spacer, a weighing sensor and a mounting base plate: the storage container is arranged on the base, a weight change of the storage container is measured by the weighing sensor for price calculation: the control module comprises a central controller, a wireless communication module and a payment module; and after the metering module generates and displays a price, a payment interface appears, and after a user pays, an instruction is sent, by the control module, to the motor to drive the motor to start the delivery module for delivering goods.

13. The gravity-box-based snack vending apparatus according to claim 12, wherein a contact surface between the base of the metering module and the storage container is an arc surface: an elongated groove of a certain width is formed in a middle of the arc surface: a bolt mounting hole is formed at an end of the groove: an end of the arc surface is stepped in a descending manner and in a U shape: a square hole is formed in a side of a U-shaped portion for wiring: a square groove is formed in a bottom of a back of the base of the metering module for arrangement of a power line and a data line: a fixing hole is further formed in the arc surface of the base for clamping and fixing with the base: the fixing hole is located at a position, close to the elongated groove, of the arc surface of the base of the metering module; a narrow and square end of the fixing hole is a limiting end: a wider and square head end of the fixing hole is a mounting buckle insertion end of the storage container: a matching mounting buckle is provided at the bottom of the storage container to fix the storage container; and a boss parallel to the horizontal plane is provided at a back of the fixing hole, the boss cooperating with the mounting buckle of the storage container to limit the storage container.

14. A network vending system using the vending apparatus according to claim 1, wherein the network vending system comprises a master station layer, a communication channel layer, and a terminal device layer composed of vending apparatuses: the master station layer is divided into a service application module, a data acquisition module, a pre-communication scheduling module, and a database management module; the communication channel layer provides a communication link for information interaction between a master station and a terminal; and the terminal device layer is responsible for collecting and providing original goods information and goods vending control for the entire system.

15. The network vending system according to claim 14, wherein the terminal device layer is divided into a data acquisition sublayer and a vending device sublayer, and comprises a vending apparatus body and a data acquisition concentrator mounted in the vending apparatus: the data acquisition concentrator is configured to connect a vending apparatus terminal with the master station layer, and performs conversion of the data communication channels and communication protocols in communication: the data acquisition sublayer collects information about the vending device, processes and freezes related data, and implements interaction with the master station; and the vending device sublayer implements goods metering and sales.

16. The network vending system according to claim 15, wherein the vending apparatus terminal system is composed of a microcontroller, a motor, a motor drive circuit, a LoRa communication module, a touch screen, and a weighing module; the LoRa module implements communication with the data acquisition concentrator, data acquired by the weighing sensor of the metering module is converted by its built-in algorithm and then transmitted to a payment module, the payment module comprises a user-oriented APP, and after payment by the payment module, an upper computer sends a delivery instruction to start the motor drive circuit to drive the motor for delivery.

17. The network vending system according to claim 16, wherein the network vending system uses an ASA architecture and further comprises a cloud platform service system, a franchisee subsystem, and a distributor subsystem; device operation data, product inventory data, product sales data, and user behavior data of the main control platform, the franchisee subsystem, the distributor subsystem, and the sales terminal are transmitted to the cloud through terminals for storage, and each role acquires different data, and processes different operations according to the division of labor; and each subsystem uses a distributed database to unify a database platform.

* * * * *